United States Patent Office 3,691,061
Patented Sept. 12, 1972

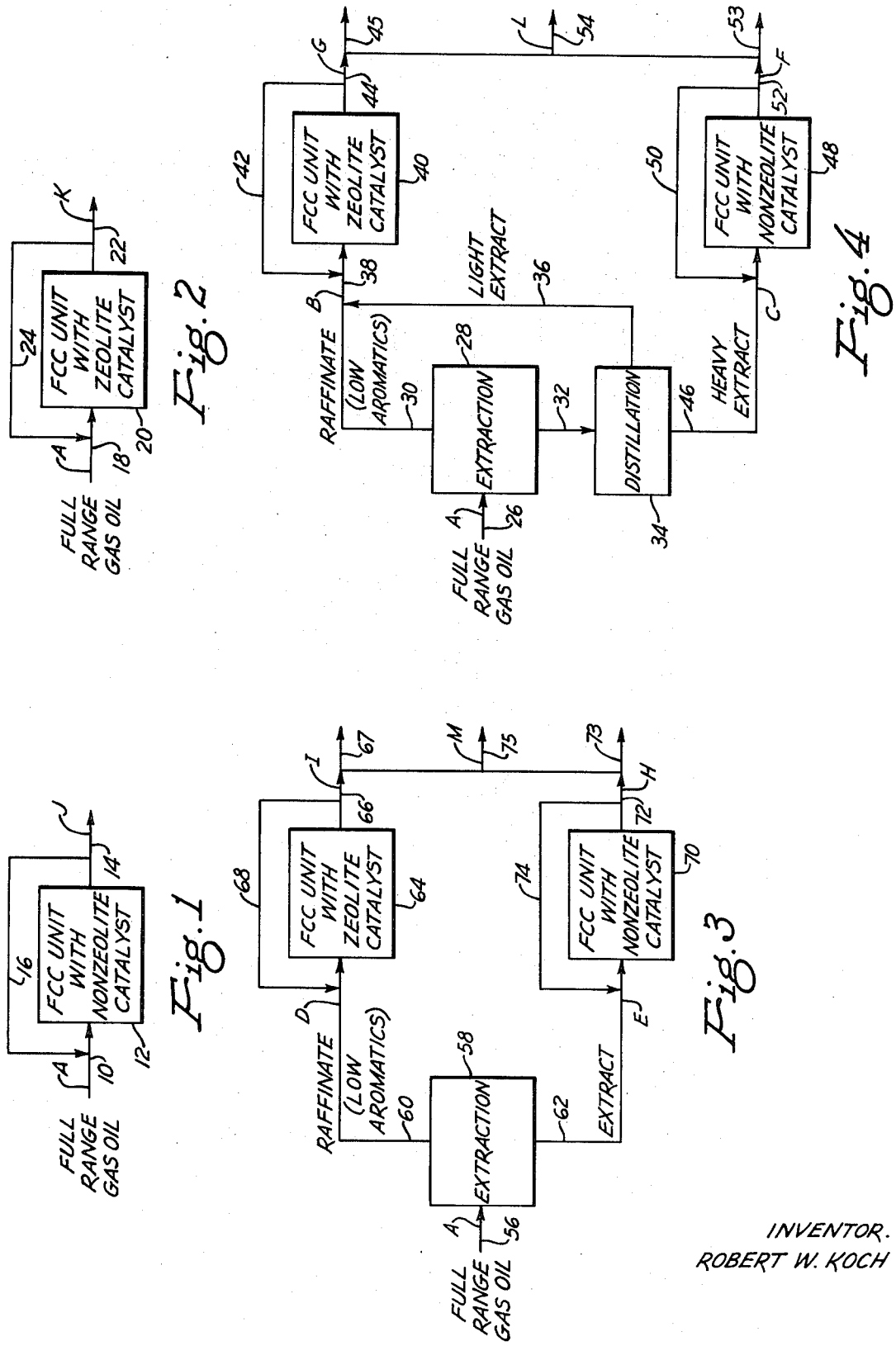

3,691,061
CRACKING OF SOLVENT EXTRACTED GAS OIL
WITHOUT ADDED HYDROGEN
Robert W. Koch, Verona, Pa., assignor to Gulf Research
& Development Company, Pittsburgh, Pa.
Filed July 23, 1970, Ser. No. 57,518
Int. Cl. C10g 21/00
U.S. Cl. 208—87                          5 Claims

ABSTRACT OF THE DISCLOSURE

A gas oil cracking feed is passed through a solvent extraction zone to separate an aromatics-lean raffinate from an aromatics-rich extract. The aromatics-lean raffinate is charged to a fluid zeolite cracking zone without added hydrogen and the aromatics-rich extract is charged to a fluid nonzeolite cracking zone without added hydrogen.

---

The present invention relates to cracking of a gas oil hydrocarbon which prior to cracking is passed through an aromatics extraction zone to separate an aromatics-rich extract fraction from an aromatics-lean raffinate fraction.

The present invention relates to cracking in a nonhydrogen atmosphere of aromatics-rich and aromatics-lean fractions of a gas oil hydrocarbon in the presence of a fluid noncrystalline, i.e., amorphous, silica alumina nonzeolite cracking catalyst and a fluid crystalline aluminosilicate zeolite cracking catalyst, respectively. According to the prior art methods wherein cracking was carried out in the presence of hydrogen under both hydrogenation and cracking conditions, it was found that high boiling polynuclear aromatics are hydrocracked more efficiently over a nonzeolite catalyst than over a zeolite catalyst, while the lower boiling monoaromatics are hydrocracked more efficiently over a zeolite catalyst. Therefore, the prior art teaches that in hydrocracking a wide boiling range gas oil as much as possible of the higher boiling (polynuclear or fused ring) aromatics should be concentrated in a stream fed to a nonzeolite catalyst chamber while as much as possible of the low boiling aromatics should be concentrated in a stream fed to a zeolite catalyst chamber. According to the prior art teaching, it would appear that distillation of the wide range gas oil feed into a light gas oil fraction and a heavy gas oil fraction would be an effective means for preparing the feed to the two zones. However, in accordance with the present invention we have found that more efficient cracking in a zeolite zone occurs when a low-aromatics feed having the same wide boiling range as the full range gas oil is charged to the zeolite chamber than if the same feed is diluted with a light gas oil.

In accordance with the present invention which relates to cracking in a nonhydrogen atmosphere, it has been found that after solvent extraction of a wide-boiling range gas oil hydrocarbon stream to produce an aromatics-rich extract stream for charging to a nonzeolite cracking chamber and an aromatics-lean raffinate stream for charging to a zeolite cracking chamber, with the extract and raffinate streams each having about the same wideboiling temperature range as the feed gas oil, the low-boiling aromatics fraction in the extract stream does not exert its expected effect in the process based upon the experience of the prior art in hydrocracking. After conventional solvent extraction of a gas oil the extract fraction is relatively rich in aromatics and because of its wide boiling range it includes both high-boiling polynuclear aromatics and lower-boiling mononuclear aromatics, while the raffinate fraction is relatively lean in aromatics but still contains a substantial quantity of aromatics which, because of the wide boiling range of the process, includes both high-boiling polynuclear aromatics and lower-boiling mononuclear aromatics. Based upon the teaching of the prior art with respect to hydrocracking it would be expected that the advantage of the solvent extraction operation is to remove the high-boiling polynuclear or fused ring aromatics from the raffinate feed to the zeolite cracking chamber, while the removal of lower boiling mononuclear aromatics, if unavoidable, is not desirable in the hydrocracking operation and for best results, in the zeolite cracking chamber, particularly, the lower boiling aromatics which were removed and are in the extract phase which is destined for the nonzeolite chamber should be fractionated from the extract phase and added to the raffinate feed to the zeolite cracking chamber.

It is a surprising discovery in accordance with the present invention in regard to cracking in a non-hydrogen atmosphere that, following the aromatics extraction step, the removal of the light gas oil fraction from the extract phase destined for the nonzeolite chamber and the addition thereof to the raffinate feed to the zeolite chamber has a deleterious effect in the zeolite cracking operation in regard to both total conversion and gasoline yield, because this is contrary to the experience of the prior art in regard to hydrocracking. Therefore, the dilution of the wide boiling range raffinate feed containing polynuclear aromatics with light gas oil which is relatively more rich in mononuclear aromatics had an adverse effect upon cracking efficiency in the zeolite cracking zone. As stated, this effect is unexpected in view of the prior art experience in hydrocracking which indicates that enrichment of the feed to the zeolite zone with mononuclear aromatics and dilution of polynuclear aromatics is beneficial. This effect also shows an advantage in solvent extraction as a method for feed preparation over simple fractionation of a full range gas oil into two nearly equal fractions; one fraction comprising mostly light gas oil feed for the zeolite zone and the other fraction comprising mostly heavy gas oil feed for the nonzeolite zone. The simple fractionation method concentrates nearly the entire light gas oil fraction in the feed for the zeolite zone in contrast to the experience of the present invention which shows an adverse effect in said zone upon increasing the concentration of light gas oil therein.

The above-described discovery is not only surprising in regard to the prior art teaching regarding hydrocracking but is also surprising in regard to experience in the prior art concerning cracking of gas oil in a non-hydrogen atmosphere in the presence of a zeolite catalyst. It has been the experience of the non-hydrogen zeolitic cracking art that the higher boiling aromatics in general were deleterious feed constituents while lower-boiling aromatics were advantageous feed constituents for gasoline production. The reason is that higher boiling aromatics, such as bicyclics, do not crack easily and tend to be absorbed upon a zeolite catalyst to lower its activity. Unlike monocyclics, which crack easily in the presence of a zeolite catalyst, the higher boiling aromatics tend to polymerize to form coke. In contrast to the present invention, the prior art experience would tend to indicate that dilution of a wide boiling raffinate feed to a zeolite cracking zone with light gas oil would enhance cracking efficiency in said zone.

It has been found that in a combination non-hydrogen cracking process utilizing both zeolite and nonzeolite catalyst the transfer of the light gas oil from the extract phase to the raffinate phase induces more than a compensating rise in activity in the nonzeolite chamber to overcome the loss of activity in the zeolite chamber. In the combination process, a full range gas oil is solvent extracted to produce a wide boiling range aromatics-rich extract phase, which is more advantageously cracked in the presence of a nonzeolite catalyst than a zeolite catalyst, and to produce a wide boiling range aromatics-lean raffinate phase which is more advantageously cracked in the presence of a zeolite catalyst than a nonzeolite catalyst. When the light gas oil fraction is separated from the extract phase feed to the nonzeolite cracking chamber and blended with the raffinate phase feed to the zeolite cracking chamber, the gasoline yield in the zeolite cracking chamber is reduced. However, the gasoline yield in the nonzeolite chamber is increased by more than a compensating amount so that when the gasoline products from the zeolite and nonzeolite cracking chambers are blended, a higher gasoline yield, a higher octane number and a higher total conversion are achieved than in a similar combination process except that the light gas oil fraction is not removed from the extract phase feed to the raffinate phase.

In all cracking zones of this invention, cracking occurs without added hydrogen at a temperature of about 850° F. to 1100° F., or more. The preferred range is 880° F. to 1000° F. The total pressure can vary widely and can be, for example, 5 to 50 p.s.i.g., or preferably 20 to 30 p.s.i.g. In the zeolite and nonzeolite fixed fluid bed chambers of FIGS. 1 through 4, space velocities of 2 to 12 W/H/W can be employed.

The full range gas oil feed to the process of the invention can have an I.B.P. of 450° to 500° F. and an E.P. of 1000° to 1050° F. The material referred to herein as light gas oil, such as the material which is removed from the extract phase and added to the raffinate phase, can have a boiling range of 450° to 650° F. Heavy gas oil therefore will have a boiling range from 650° to 1000° or 1050° F. The light gas oil fraction can slightly overlap the heavy gas oil fraction in which case its E.P. will be about 670° F. The solvent used for aromatics extraction in the tests described below was furfural.

The cracking operation with both zeolite and nonzeolite catalyst occurs without hydrogen addition to the reactor and therefore occurs without nickel or other catalytic hydrogenation metal on the catalyst. Since the cracking atmosphere does not contain hydrogen the aromatic rings are not saturated and are difficult to crack, which accounts for the basic distinction between the present process and hydrocracking.

FIG. 1 shows a simple process for fluid bed cracking with a nonzeolite catalyst. A full range gas oil as described at A in the data of Example 1 is charged through line 10 to fluid nonzeolite catalyst cracking chamber 12. An effluent stream as described at J in the data of Example 3 is recovered through line 14 while a portion of the effluent is recycled through line 16.

FIG. 2 shows a simple process for fluid bed cracking with a zeolite catalyst. A full range gas oil as described at A in the data of Example 1 is charged through line 18 to fluid bed zeolite catalyst cracking chamber 20. An effluent stream as described at K in the data of Example 3 is recovered through line 22 while a portion of the effluent is recycled through line 24.

In the process scheme of FIG. 3 a full range gas oil as described at A in the data of Example 1 is charged through line 56 to extraction zone 58 utilizing furfural as a solvent from which zone a low aromatics raffinate is recovered as described at D in the data of Example 1 through line 60 and a high aromatics extract as described at E in the data of Example 1 through line 62. The raffinate in line 60 is charged to reactor 64 containing a fluid bed of zeolite catalyst which discharges an effluent stream through line 66 as described at I in the data of Example 2, a portion of which is recycled through line 68. The high aromatics extract in line 62 is charged to fluid bed nonzeolite catalyst reactor 70 from which an effluent stream as described at H in the data of Example 2 is discharged through line 72, a portion of which is recycled through line 74. The individual effluents in lines 66 and 72 can be removed from the system through lines 67 and 73, respectively, and can be individually utilized as sources of leaded or unleaded gasoline stocks, or the two entire effluent streams can be merged in line 75 to provide a total process product as described at M in the data of Example 3.

In FIG. 4 a full range gas oil as described at A in the data of Example 1 is charged to an aromatics extraction unit 28 utilizing furfural as a solvent from which unit a low aromatics raffinate fraction is removed through line 30 while a high aromatics extract is removed through line 32 and passed to a distillation zone 34. Zone 34 discharges a light gas oil extract fraction through line 36 which blends with the low aromatics raffinate in line 30 to produce the feed in line 38 as described at B in the data of Example 1 which is charged to the fluid zeolite catalyst bed reactor 40 having recycle line 42 and effluent line 44 whose composition is shown at G in the data of Example 2. Distillation zone 34 discharges a heavy gas oil extract effluent through line 46 as described at C in the data of Example 1 which is charged to nonzeolite fluid catalyst bed reactor having a recycle line 50 and a discharge line 52 containing an effluent stream as described at F in the data of Example 2. The effluents from lines 44 and 52 can be removed from the system through lines 45 and 53, respectively, and can be used as individual sources of leaded or unleaded gasoline stocks or the two entire effluent streams can be merged in line 54 to produce a combined product as described at L in the data of Example 3.

Following are the operating conditions employed for the FCC zeolite and nonzeolite reactors shown in FIGS. 1 through 4.

| Operating data | FCC units using synthetic nonzeolite catalyst | FCC units using zeolite catalyst |
| --- | --- | --- |
| Total recycle, volume percent | 37.1 | 11.3 |
| Cat. to oil ratio (total feed) | 8.6 | 7.3 |
| Space velocity, w./h./w. (total feed) | 2.7 | 3.4 |
| Catalyst activity, Kellogg, 2 hr | 26.7 | 49.5 |
| Carbon on regenerated Catalyst, percent | 0.39 | 0.32 |
| Reactor temperature, ° F | 917 | 917 |
| Dispersion steam, weight percent (total feed) | 0.90 | 1.86 |
| Reactor pressure, p.s.i.g | 14.4 | 16.8 |

The fractionation of the feed by means of solvent extraction in accordance with the present invention produces a much more effective distribution of aromatics between two phases than could be achieved by simple fractionation into relatively high and low boiling fractions. For example, in accordance with the present invention, the extract commonly contains at least twice the concentration of aromatics as the raffinate. More commonly, the extract contains 3, 4 or 5 times and more aromatics than the raffinate. Any known aromatics solvent can be employed for the extraction. Solvents known in the art include methanol, ethanol, phenol, furfural, ethylene glycol, monomethyl ether, acetonitrile, sulfur dioxide, etc. The solvents resolve a full range gas oil into a high aromatics extract phase and a low aromatics raffinate phase, each phase having substantially the full boiling range of the feed gas oil and each phase tending to contain monoaromatics in its lower boiling portion and polynuclear or fused ring aromatics in its higher boiling portion. This type of separation is contrasted with distillation of a full range gas oil fraction into two equal phases in which case the amount of aromatics are about equal in the two phases with the monoaromatics tending to be concentrated in the lower boiling fraction and the polynuclear or fused ring aromatics tending to be concentrated in the higher boiling fraction. The type of aromatics distribution achieved by distillation is not equivalent to the type of aromatics distribution achieved by solvent extraction in accordance with the discovery of this invention because under the distillation method of aromatics distribution the heavy gas oil phase containing most of the polynuclear aromatics is charged to the nonzeolite catalyst chamber leaving the light gas oil phase containing substantially most of the monoaromatics in the feed for the zeolite catalyst chamber, whereas it has now been discovered that dilution of a wide boiling range raffinate feed to a zeolite cracking zone with light gas oil performs a deleterious effect upon gasoline yields in the zeolite cracking zone.

The following examples present typical feed stock data and actual and mathematical model yields based upon correlations from many feeds for the described processing schemes.

EXAMPLE 1

The following table presents the properties of the FCC feedstocks referred to in FIGS. 1 through 4 of the drawings.

PROPERTIES OF THE FCC FEEDSTOCKS REFERRED TO IN FIGS. 1 THROUGH 4

| Drawing designation | A | B | C | D | E |
|---|---|---|---|---|---|
| Catalyst in unit where charged | (1) | Zeolite | Nonzeolite | Zeolite | Nonzeolite |
| Name of stock | (2) | (3) | (4) | (5) | (6) |
| Gravity, °API | 23.9 | 30.0 | 8.5 | 32.0 | 10.2 |
| Sulfur, wt. percent | 2.63 | 1.53 | 5.78 | 1.06 | 5.59 |
| Nitrogen, wt. percent | 0.066 | 0.010 | 0.205 | 0.011 | 0.171 |
| Aniline point, °F | 170 | 192 | 79 | 207 | 75 |
| ASTM: | | | | | |
| 10%, °F | 589 | 571 | 752 | 583 | 605 |
| 30%, °F | 715 | 645 | 807 | 677 | 731 |
| 50%, °F | 799 | 765 | 862 | 793 | 813 |
| 70%, °F | 876 | 883 | 927 | 902 | 894 |
| 90%, °F | 958 | 984 | 983 | 989 | 970 |
| Fraction light gas oil (B.P. below 650° F.) | 0.193 | 0.241 | 0 | 0.303 | 0.164 |
| Mean avg. boiling point, °F | 761 | 757 | 855 | 736 | 777 |
| Fraction aromatics | 0.238 | 0.139 | 0.588 | 0.170 | 0.562 |

1 Nonzeolite or zeolite.
2 Full range gas oil.
3 Raffinate plus light extract.
4 Heavy extract.
5 Raffinate.
6 Full range extract.

EXAMPLE 2

The following table describes the individual yields of the FCC units referred to in FIGS. 1 through 4 of the drawings.

INDIVIDUAL FCC YIELDS REFERRED TO IN FIGS. 1 THROUGH 4

| Drawing designation | F | G | H | I |
|---|---|---|---|---|
| Catalyst type | Nonzeolite | Zeolite | Nonzeolite | Zeolite |
| Feedstock | (1) | (2) | (3) | (4) |
| FCC yields: | | | | |
| Conversion, volume percent | 66.9 | 85.7 | 64.2 | 89.6 |
| Debutanized gasoline, volume percent | 44.4 | 61.3 | 42.6 | 64.3 |
| $C_5$+ gasoline, volume percent | 35.7 | 47.7 | 34.2 | 49.2 |
| $C_5$-$C_5$=, volume percent | 8.8 | 13.6 | 8.4 | 15.1 |
| $C_4$-$C_4$=, volume percent | 12.6 | 19.6 | 12.3 | 21.0 |
| $C_3$-$C_3$=, volume percent | 9.5 | 12.3 | 9.5 | 13.1 |
| $C_2$ and ltr., weight percent | 5.5 | 4.4 | 5.6 | 4.4 |
| Coke, weight percent | 15.2 | 7.4 | 13.5 | 7.2 |
| Motor, clear | 79.2 | 75.9 | 79.0 | 74.9 |
| Research, clear | 94.4 | 91.8 | 94.4 | 89.9 |

1 Heavy extract.
2 Raffinate plus light extract.
3 Full range extract.
4 Raffinate.

The above data show that low aromatics raffinate stream I from the zeolite reactor exhibits a greater total conversion and a greater conversion to debutanized gasoline, but with lower octane numbers, as compared to stream K, described below, which relates to treatment of a full range feed with zeolite only. On the other hand, the above data show that high aromatics extract stream H from the nonzeolite reactor exhibits a lower total conversion and a lower conversion to debutanized gasoline, but with comparable octane numbers, as compared to stream J, described below, which relates to treatment of a full range feed with nonzeolite catalyst only.

EXAMPLE 3

The following table describes the combined FCC unit yields referred to in FIGS. 1 through 4 of the drawings.

COMBINED FCC YIELDS REFERRED TO IN FIGS. 1 THROUGH 4

| Drawing designation | J | K | L | M |
|---|---|---|---|---|
| Zeolite FCC run: | | | | |
| Percent of full range gas oil charge | | 100 | 72.4 | 63.9 |
| Fraction charged | | (1) | (2) | (3) |
| Nonzeolite FCC run: | | | | |
| Percent of full range gas oil charge | 100 | | 27.6 | 36.1 |
| Fraction charged | (1) | | (4) | (5) |
| Combined FCC yields: | | | | |
| Conversion, volume percent | 69.5 | 79.2 | 80.5 | 80.4 |
| Debutanized gasoline, volume percent | 48.2 | 55.7 | 56.7 | 56.5 |
| $C_5$+ gasoline, volume percent | 37.2 | 44.7 | 44.4 | 43.8 |
| $C_5$-$C_5$=volume percent | 11.0 | 11.0 | 12.2 | 12.7 |
| $C_4$-$C_4$=volume percent | 15.3 | 17.2 | 17.7 | 17.9 |
| $C_3$-$C_3$=volume percent | 10.1 | 11.3 | 11.5 | 11.8 |
| $C_2$ and ltr., weight percent | 4.1 | 4.5 | 4.7 | 4.8 |
| Coke, weight percent | 9.1 | 9.0 | 9.6 | 9.5 |
| Motor, clear | 79.7 | 77.0 | 76.8 | 76.4 |
| Research, clear | 93.6 | 91.5 | 92.5 | 91.5 |

1 Full range gas oil.
2 Raffinate plus light extract.
3 Raffinate.
4 Heavy extract.
5 Extract.

An important feature indicated in the above data is that stream M which is the result of treatment with both zeolite and nonzeolite catalyst exhibits a higher total conversion and a higher conversion to debutanized gasoline than stream K which is the result of treatment of the total feed with zeolite catalyst even though stream J shows that treatment of any portion of the feed with a nonzeolite catalyst would be expected to reduce both total conversion and conversion to debutanized gasoline.

A further highly important feature of the above data is the showing that the unexpectedly high total conversion and conversion to debutanized gasoline as well as octane numbers exhibited by stream M are further enhanced in stream L, which is the blended product of FIG. 4. In accordance with the present invention, with special reference to FIG. 4, it has been found that the light gas oil portion of the extract stream has a marked effect upon gasoline yield in both the zeolite and nonzeolite chambers. Referring to the data in Example 2, it is seen that when the full range extract is distilled to remove the light gas oil (450° to 650° F.) fraction therefrom to produce a heavy extract having no light gas oil, and the removed light gas oil is added to the raffinate to produce a raffinate plus light extract stream, the gasoline yield from the extract was increased from 42.6 to 44.4 volume percent while the gasoline yield from the raffinate was decreased from 64.3 to 61.3 volume percent. It is seen that removal of the light gas oil from the extract increased gasoline yield from that stream and the addition of the light gas oil to the raffinate stream decreased gasoline yield from that stream. This effect is surprising since the prior art teaches in regard to hydrocracking that it is the transfer of only high boiling aromatics to the raffinate feed to a zeolite cracking reactor which is detrimental and that lower molecular weight monoaromatics are advantageously transferred from a nonzeolite cracking zone feed to a zeolite cracking zone feed to improve efficiency in said zeolite zone.

EXAMPLE 4

The following data illustrates that the large difference in aromatics concentration in raffinate and extract streams from solvent extraction is not achieved through distillation of the feed. The first two columns of the following data show zeolite cracking feed stocks having large differences in mean average boiling point but relatively minor differences in aromatics content. The second two columns of the following data show zeolite cracking feed stocks having smaller differences in mean average boiling point but greater differences in aromatics content. The data therefore indicate that distillation of a cracking feed into fractions of widely different mean average boiling points will not necessarily produce wide differences in aromatics concentration.

greater effect upon total conversion and gasoline yield in a zeolite reactor than do great differences in average boiling point of the feed accompanied by smaller variations in aromatics content.

EXAMPLE 5

Data were taken to illustrate the criticality to the present invention of employing an amorphous nonzeolite catalyst chamber in conjunction with a zeolite catalyst chamber, rather than employing two separate zeolite catalyst chambers. The data relate to a process as shown in FIG. 3, except that chamber 70 contains a zeolite catalyst rather than a nonzeolite catalyst and the operating conditions for a zeolite chamber as presented above were adopted, while chamber 64 continues to contain a zeolite catalyst. The feed stock and operating conditions are otherwise unchanged from those used in the process of FIG. 3. The following data show the product characteristics based upon a raffinate feed as described above to reactor 64 and the product characteristics based upon a full range extract feed as described above to reactor 70.

|  | Catalyst type | |
| --- | --- | --- |
|  | Zeolite | Zeolite |
| Feedstock | Raffinate | Full range extract |
| FCC yields: |  |  |
| Conversion, vol. percent | 89.6 | 65.8 |
| Debutanized gasoline, vol. percent | 64.3 | 33.4 |
| $C_6+$ gasoline, vol. percent | 49.2 | 29.2 |
| $C_5$-$C_5=$, vol. percent | 15.1 | 4.2 |
| $C_4$-$C_4=$, vol. percent | 21.0 | 11.7 |
| $C_3$-$C_3,=$ vol. percent | 13.1 | 13.5 |
| $C_2$ and ltr., wt. percent | 4.4 | 4.0 |
| Coke, wt. percent | 7.2 | 17.8 |
| Motor, clear | 74.9 | 76.0 |
| Research, clear | 89.9 | 92.0 |

The following data show the characteristics of the combined feed from the two zeolite reactors.

| Zeolite FCC runs: |  |  |
| --- | --- | --- |
| Percent full range gas oil charged | 63.9 | 36.1 |
| Fraction charged | Raffinate | Extract |
| Combined FCC yields: |  |  |
| Conversion, vol. percent | 81.0 |  |
| Debutanized gasoline, vol. percent | 53.1 |  |
| $C_6+$ gasoline, vol. percent | 42.0 |  |
| $C_5$-$C_5=$, vol. percent | 11.2 |  |
| $C_4$-$C_4=$, vol. percent | 17.6 |  |
| $C_3$-$C_3=$, vol. percent | 13.2 |  |
| $C_2$ and ltr., weight percent | 4.6 |  |
| Coke, wt. percent | 11.0 |  |
| Motor, clear | 75.2 |  |
| Research, clear | 90.7 |  |

|  | High light gas oil in feed | Low light gas oil in feed | High aromatics in feed | Low aromatics in feed |
| --- | --- | --- | --- | --- |
| Feed preparation | (1) | (1) | (2) | (1) |
| Gravity: ° API | 32.4 | 25.7 | 14.9 | 27.6 |
| Sulfur, wt. percent | 0.14 | 0.79 | 0.41 | 0.27 |
| Nitrogen, wt. percent | 0.003 | 0.076 | 0.053 | 0.047 |
| ASTM: |  |  |  |  |
| 10%, ° F | 565 | 595 | 696 | 807 |
| 50%, ° F | 583 | 773 | 788 | 850 |
| 90%, ° F | 632 | 969 | 865 | 923 |
| Fraction light gas oil | 0.928 | 0.210 | 0.067 | 0.0 |
| Mean average boiling point, ° F | 588 | 749 | 777 | 854 |
| Fraction aromatics | 0.128 | 0.194 | 0.376 | 0.171 |
| Total recycle, volume percent | 2.4 | 2.6 | 2.6 | 2.5 |
| Catalyst to oil ratio (total feed) | 7.3 | 8.1 | 8.2 | 8.0 |
| Space velocity, w./h./w. (total feed) | 6.04 | 6.05 | 9.90 | 9.85 |
| Catalyst type | | Zeolite | | |
| Activity, Kellogg 2 hr | 38.6 | 38.6 | 40.9 | 40.9 |
| Carbon on regenerated catalyst, percent | 0.27 | 0.33 | 0.37 | 0.37 |
| Reactor temp., ° F | 878 | 879 | 910 | 910 |
| Dispersed steam, wt. percent (total feed) | 5.70 | 6.70 | 6.40 | 7.10 |
| Reactor press, p.s.i.g | 25.1 | 25.2 | 25.1 | 25.1 |
| Conversion, vol. percent | 74.7 | 70.7 | 61.1 | 76.9 |
| Debutanized gas, vol. percent | 59.8 | 54.5 | 47.7 | 60.7 |
| $C_6+$ gasoline, vol. percent | 47.0 | 43.2 | 41.1 | 49.5 |
| $C_5$-$C_5=$, vol. percent | 12.8 | 11.3 | 6.6 | 11.2 |
| $C_4$-$C_4=$, vol. percent | 15.4 | 13.7 | 10.5 | 14.5 |
| $C_3$-$C_3=$, vol. percent | 8.2 | 8.0 | 7.5 | 9.9 |
| $C_2$ and ltr., wt. percent | 2.3 | 3.1 | 3.8 | 3.8 |
| Coke, wt. percent | 3.8 | 7.4 | 7.9 | 6.0 |

[1] Not solvent extracted.
[2] Solvent extracted.

The cracking data presented in the above tabe show that great differences in feed aromatics concentration, regardless of average boiling point of the feed, have a much Comparing the product characteristics presented above of the combined product stream from two zeolite reactors with the product characteristics of the combined product stream M from the process of FIG. 3, it is seen that use of both a zeolite and a nonzeolite catalyst chamber rather than two zeolite catalyst chambers results in a considerably higher gasoline yield, a higher octane number gasoline product, and a lower coke yield.

I claim:

1. A process for cracking a feed gas oil comprising subjecting said gas oil to aromatics extraction to produce an aromatics-lean raffinate fraction having a boiling range substantially as wide as that of the feed gas oil and an aromatics-rich extract fraction for cracking without saturating the aromatic rings, cracking said wide boiling range raffinate fraction in the presence of a fluid crystalline aluminosilicate zeolite cracking catalyst without added hydrogen to produce a first gasoline-containing product and cracking said extract fraction in the presence of a fluid amorphous silica alumina nonzeolite cracking catalyst substantially free of zeolite without added hydrogen to produce a second gasoline-containing product.

2. The process of claim 1 wherein said first gasoline-containing product is blended with said second gasoline-containing product.

3. The process of claim 1 wherein the concentration of aromatics in said aromatics-rich extract fraction is at least about twice as high as the concentration of aromatics in said aromatics-lean raffinate fraction.

4. The process of claim 1 wherein the concentration of aromatics in said aromatics-rich extract fraction is at least three times as high as the concentration of aromatics in said aromatics-lean raffinate fraction.

5. A process for cracking a feed gas oil comprising subjecting said gas oil to aromatics extraction to produce an aromatics-lean raffinate fraction having a boiling range substantially as wide as that of the feed gas oil, and an aromatics-rich extract fraction for cracking without saturating the aromatic rings, the concentration of aromatics in said extract fraction being at least twice the concentration of aromatics in said raffinate fraction, cracking said wide boiling range raffinate fraction in the presence of a fluid crystalline aluminosilicate zeolite cracking catalyst without added hydrogen to produce a first gasoline-containing product, cracking said extract fraction in the presence of a fluid amorphous silica alumina nonzeolite cracking catalyst substantially free of zeolite without added hydrogen to produce a second gasoline-containing product and blending said first and second gasoline-containing products.

References Cited

UNITED STATES PATENTS

| | | | |
|---|---|---|---|
| 3,331,766 | 7/1967 | Young | 208—87 |
| 2,279,550 | 4/1942 | Benedict et al. | 208—87 |
| 3,159,567 | 12/1964 | Young | 208—87 |
| 3,210,267 | 10/1965 | Plank et al. | 208—120 |

HERBERT LEVINE, Primary Examiner

U.S. Cl. X.R.

208—78, DIG 2